(12) United States Patent
Gu

(10) Patent No.: US 12,228,964 B2
(45) Date of Patent: Feb. 18, 2025

(54) DISPLAY DEVICE, SUPPORTING FILM FOR DISPLAY DEVICE AND ELECTRONIC APPARATUS

(71) Applicant: BOE Technology Group Co., Ltd., Beijing (CN)

(72) Inventor: Penghao Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 524 days.

(21) Appl. No.: 17/418,938

(22) PCT Filed: Dec. 29, 2020

(86) PCT No.: PCT/CN2020/141044
§ 371 (c)(1),
(2) Date: Jun. 28, 2021

(87) PCT Pub. No.: WO2021/169581
PCT Pub. Date: Sep. 2, 2021

(65) Prior Publication Data
US 2022/0308624 A1 Sep. 29, 2022

(30) Foreign Application Priority Data
Feb. 24, 2020 (CN) .......................... 202010114130.3

(51) Int. Cl.
*G06F 1/16* (2006.01)
(52) U.S. Cl.
CPC .......... *G06F 1/1616* (2013.01); *G06F 1/1652* (2013.01); *G06F 1/1656* (2013.01); *B32B 2457/20* (2013.01)
(58) Field of Classification Search
CPC ......... B32B 3/16; B32B 7/12; B32B 2307/51; G02F 1/33305; G06F 1/1652;
(Continued)

(56) References Cited

U.S. PATENT DOCUMENTS 9,818,974 B2 11/2017 Kwon et al.
9,933,870 B2 4/2018 You et al.
(Continued)

FOREIGN PATENT DOCUMENTS

CN 105989783 A 10/2016
CN 106652802 A 5/2017
(Continued)

OTHER PUBLICATIONS

Machine translation of CN 111187576 via EPO (Year: 2020).*
(Continued)

*Primary Examiner* — Laura C Powers
*Assistant Examiner* — Rebecca L Grusby
(74) *Attorney, Agent, or Firm* — WHDA, LLP

(57) ABSTRACT

A display device, a support film for the display device, and an electronic apparatus are provided. The display device includes: a display panel including: a bendable area including at least a display area of the display panel; a binding area which comprises a part of a non-display area of the display panel; and a folding area, wherein the shielding area is located between the bendable area and the binding area; and a support film coupled to a back surface of the display panel, the support film including a first film portion and a second film portion, an orthographic projection of the first film portion on the display panel falling into the bendable area, and an orthographic projection of the second film portion on the display panel falling into the binding area. The material of the first film portion is different from the material of the second film portion.

13 Claims, 9 Drawing Sheets

(58) Field of Classification Search
CPC .......... G06F 1/1616–162; G09F 9/301; H04M 1/0268; H04M 1/0269; H10K 77/10–111
See application file for complete search history.

(56) References Cited

U.S. PATENT DOCUMENTS

| | | | |
|---|---|---|---|
| 11,081,660 B2 | 8/2021 | Lee et al. | |
| 11,143,891 B2 | 10/2021 | Lee et al. | |
| 2016/0275830 A1 | 9/2016 | You et al. | |
| 2017/0179423 A1 | 6/2017 | Kwon et al. | |
| 2017/0352834 A1* | 12/2017 | Kim | G02F 1/133305 |
| 2018/0180911 A1* | 6/2018 | Odaka | G02F 1/13452 |
| 2018/0182983 A1 | 6/2018 | Bae et al. | |
| 2018/0375044 A1* | 12/2018 | Sasabayashi | G09G 3/3225 |
| 2019/0207130 A1* | 7/2019 | He | H10K 71/80 |
| 2019/0341566 A1 | 11/2019 | Lee et al. | |
| 2020/0004077 A1 | 1/2020 | Lee et al. | |
| 2020/0013987 A1* | 1/2020 | Lee | G09F 9/301 |
| 2020/0044171 A1* | 2/2020 | Hu | H01L 27/00 |
| 2020/0266367 A1 | 8/2020 | Wang et al. | |
| 2021/0091321 A1* | 3/2021 | Jeon | H01L 25/18 |
| 2021/0274659 A1 | 9/2021 | Cai et al. | |
| 2021/0349341 A1 | 11/2021 | Ee et al. | |
| 2021/0354422 A1* | 11/2021 | Chen | B32B 7/022 |
| 2021/0367173 A1 | 11/2021 | Lee et al. | |
| 2022/0006043 A1* | 1/2022 | E | B32B 37/30 |
| 2022/0376205 A1* | 11/2022 | Gu | H10K 50/841 |

FOREIGN PATENT DOCUMENTS

| | | | | |
|---|---|---|---|---|
| CN | 106887186 A | 6/2017 | | |
| CN | 108597378 A | 9/2018 | | |
| CN | 109461374 A | 3/2019 | | |
| CN | 110137377 A | 8/2019 | | |
| CN | 110444678 A | 11/2019 | | |
| CN | 110660322 A | 1/2020 | | |
| CN | 111187576 A | * | 5/2020 | C09J 7/25 |
| CN | 111292621 A | 6/2020 | | |

OTHER PUBLICATIONS

Office Action dated Mar. 3, 2021, issued in counterpart CN application No. 202010114130.3, with English translation. (19 pages).
International Search Report dated Mar. 26, 2021, issued in counterpart International application No. PCT/CN2020/141044, with English translation. (6 pages).

* cited by examiner

DISPLAY DEVICE, SUPPORTING FILM FOR DISPLAY DEVICE AND ELECTRONIC APPARATUS

CROSS REFERENCE

This application is a Section 371 National Stage Application of International Application No. PCT/CN2020/141044, filed on Dec. 29, 2020, entitled "DISPLAY DEVICE, SUPPORTING FILM FOR DISPLAY DEVICE AND ELECTRONIC APPARATUS", which claims priority to Chinese Application No. 202010114130.3, filed on Feb. 24, 2020, the content of which is incorporated herein by reference in their entirety.

TECHNICAL FIELD

The present disclosure relates to a field of display technology, and in particular to a display device, a supporting film for the display device and an electronic apparatus.

BACKGROUND

A display device is a device that may display information such as texts, images, or videos. Examples of display devices include liquid crystal display devices (LCD), organic light emitting diode display devices (OLED), plasma display devices, and the like. In recent years, flexible display devices have attracted more and more attention due to characteristics of bendable, foldable or rollable. The flexible display device may protect and support a flexible display panel by attaching a supporting structure to a bottom of the flexible display panel. Generally, a thickness of the supporting structure is relatively thicker than thicknesses of other single film layers of the flexible display panel. Therefore, flexural recovery performance, flexural strength, and deformability of the supporting structure will directly affect an overall flexural performance of the flexible display device.

Above information disclosed in this part is only used to understand the background of the inventive concept of the present disclosure, and therefore, the above information may include information that does not constitute the prior art.

SUMMARY

In order to solve at least one aspect of aforementioned problems, embodiments of the present disclosure provide a display device, a supporting film for the display device and an electronic apparatus.

In one aspect, a display device is provided, wherein the display device includes:
 a display panel, the display panel includes:
 a bendable area, the bendable area includes at least a display area of the display panel;
 a bonding area, the bonding area includes a part of a non-display area of the display panel; and
 a folding area, the folding area is located between the bendable area and the bonding area; and
 the display device further include a supporting film, the supporting film is adhered to a back surface of the display panel, the supporting film includes a first film portion and a second film portion, an orthographic projection of the first film portion on the display panel falls within the bendable area, and an orthographic projection of the second film portion on the display panel falls within the bonding area,
 wherein a material of the first film portion is different from a material of the second film portion.

According to some exemplary embodiments, the first film portion includes a first supporting portion, the second film portion includes a second supporting portion, and an elastic modulus of the material of the first supporting portion is greater than an elastic modulus of the material of the second supporting portion.

According to some exemplary embodiments, a light transmittance of the second supporting portion is greater than a light transmittance of the first supporting portion.

According to some exemplary embodiments, a thickness of the first supporting portion is smaller than a thickness of the second supporting portion.

According to some exemplary embodiments, the first film portion further includes a first adhesive portion stacking the first supporting portion, the first supporting portion is adhered to the back surface of the display panel through the first adhesive portion, and an orthographic projection of the first adhesive portion on the display panel falls within an orthographic projection of the first supporting portion on the display panel; and
 the thickness of the first supporting portion is smaller than a thickness of the first adhesive portion.

According to some exemplary embodiments, the second film portion further includes a second adhesive portion overlapping the second supporting portion, the second supporting portion is adhered to the display panel by the second adhesive portion, and an orthographic projection of the second adhesive portion on the display panel falls within an orthographic projection of the second supporting portion on the display panel; and
 the thickness of the second supporting portion is greater than a thickness of the second adhesive portion.

According to some exemplary embodiments, a sum of the thickness of the first supporting portion and the thickness of the first adhesive portion is equal to a sum of the thickness of the second supporting portion and the thickness of the second adhesive portion.

According to some exemplary embodiments, the first supporting portion includes at least one of following materials: polyimide, nickel-iron alloy, copper-zinc alloy or nickel-titanium alloy; and/or, the second supporting portion includes polyethylene terephthalate.

According to some exemplary embodiments, the elastic modulus of the material of the first supporting portion is 20 to 200 times the elastic modulus of the material of the second supporting portion.

According to some exemplary embodiments, the supporting film further includes a groove, the groove is located between the first film portion and the second film portion to separate the first film portion from the second film portion, and an orthographic projection of the groove on the display panel falls within the folding area.

According to some exemplary embodiments, the second film portion is located on a side of the first film portion away from the display panel, and the display device further includes a third adhesive portion between the first film portion and the second film portion.

According to some exemplary embodiments, a surface of the third adhesive portion close to the first film portion directly contacts the first supporting portion, and a surface of the third adhesive portion close to the second film portion directly contacts the second supporting portion.

According to some exemplary embodiments, the display device further includes a supporting member between the first film portion and the third adhesive portion.

According to some exemplary embodiments, the display device further includes a fourth adhesive portion between the first film portion and the supporting member;

a surface of the third adhesive portion close to the supporting member directly contacts the supporting member, and a surface of the third adhesive portion close to the second film portion directly contacts the second supporting portion;

a surface of the fourth adhesive portion close to the supporting member directly contacts the supporting member, and a surface of the fourth adhesive portion close to the first film portion directly contacts the first supporting portion.

In another aspect, a supporting film for a display device is provided, wherein the supporting film includes:

a first film portion, the first film portion includes a first supporting portion and a first adhesive portion that are stacked with each other;

a second film portion, the second film portion includes a second supporting portion and a second adhesive portion that are stacked with each other;

a groove, the groove is located between the first film portion and the second film portion to separate the first film portion from the second film portion;

a protective film, the protective film is located on a side of the first supporting portion away from the first adhesive portion, and the protective film covers the first supporting portion and the second supporting portion; and a release film, the release film is located on a side of the first adhesive portion away from the first supporting portion, and the release film covers the first supporting portion and the second supporting portion, wherein a material of the first supporting portion is different from a material of the second supporting portion.

In yet another aspect, an electronic apparatus is provided, wherein the electronic apparatus includes the display device described above.

BRIEF DESCRIPTION OF THE DRAWINGS

Through following description of the present disclosure with reference to drawings, other purposes and advantages of the present disclosure will be apparent and may facilitate a comprehensive understanding of the present disclosure.

Figure 1:
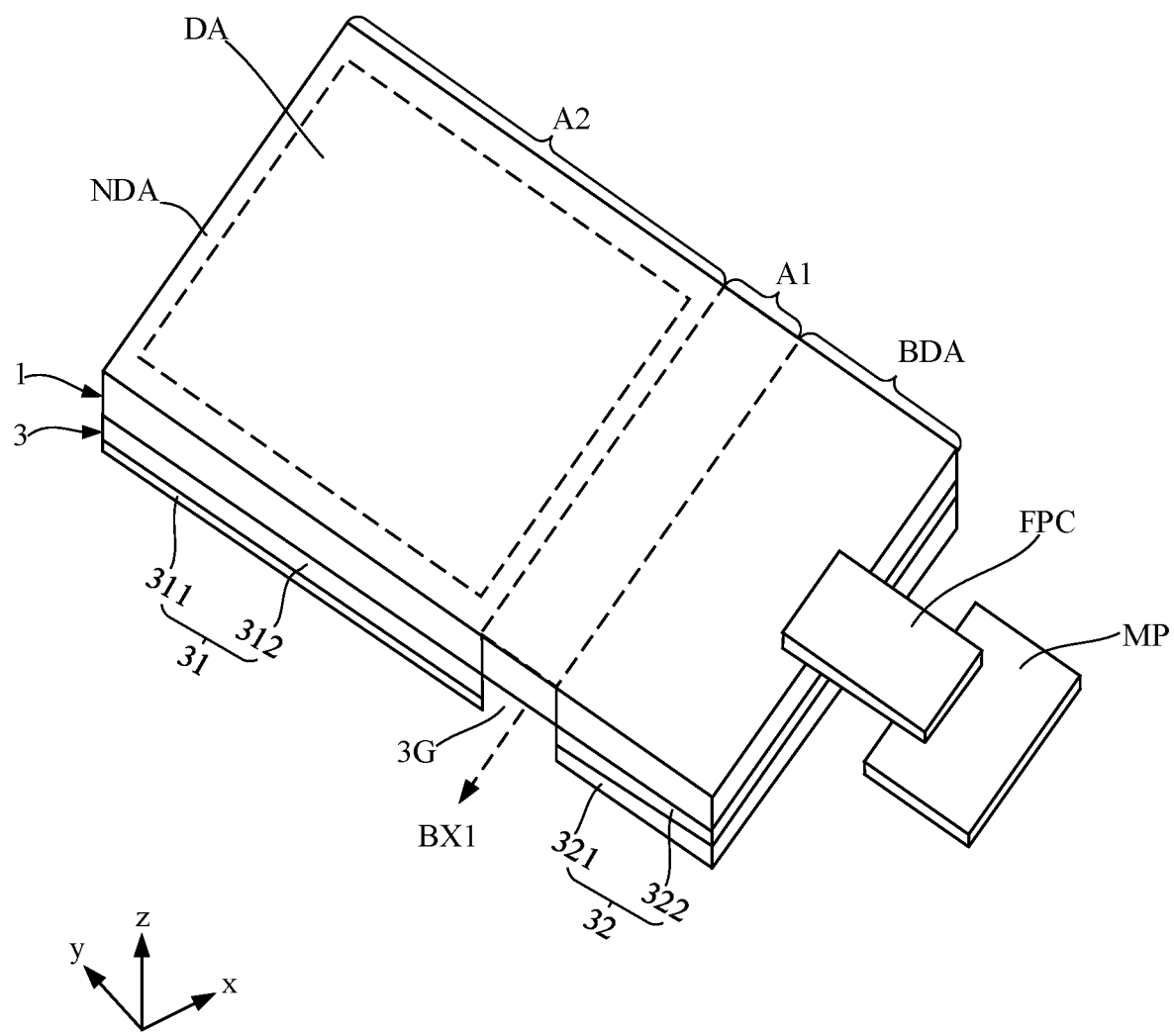
FIG. 1 is a perspective view of a display device according to some exemplary embodiments of the present disclosure.

It should be noted that, for clarity, in the drawings used to describe the embodiments of the present disclosure, sizes of layers, structures or regions may be enlarged or reduced, that is, the drawings are not drawn according to actual scale.

DETAILED DESCRIPTION OF EMBODIMENTS

In following description, for purpose of explanation, many specific details are set forth to provide a comprehensive understanding of various exemplary embodiments. However, it is obvious that the various exemplary embodiments may be implemented without these specific details or with one or more equivalent arrangements. In other cases, well-known structures and devices are shown in block diagram form to avoid unnecessarily obscuring the various exemplary embodiments. In addition, the various exemplary embodiments may be different, but are not necessary to be exclusive. For example, without departing from an inventive concept, specific shapes, configurations, and characteristics of the exemplary embodiment may be used or implemented in another exemplary embodiment.

In the drawings, for purpose of clarity and/or description, a size and a relative size of an element may be enlarged. In this way, the size and the relative size of each element are not necessary to be limited to those shown in the drawings. When the exemplary embodiments may be implemented differently, specific process sequence may be performed differently from the sequence described. For example, two consecutively described processes may be performed substantially simultaneously or in an sequence opposite to the described sequence. In addition, the same reference numerals indicate the same elements.

When an element is described as being "on", "connected to" or "coupled to" another element, the element may be directly on the another element, directly connected to the another element or directly coupled to the another element, or an intermediate element may be present. However, when an element is described as being "directly on", "directly connected to" or "directly coupled to" another element, there is no intermediate element. Other terms and/or expressions used to describe the relationship between elements should be interpreted in a similar manner, for example, "between" and "directly between", "adjacent" and "directly adjacent", "on" and "directly on" etc. In addition, the term "connect" may refer to a physical connection, an electrical connection, a communication connection, and/or a fluid connection. In addition, X axis, Y axis, and Z axis are not limited to the three axes of the Cartesian coordinate system, and may be interpreted in a broader meaning. For example, the X axis, the Y axis, and the Z axis may be perpendicular to each other, or may represent different directions that are not perpendicular to each other. For the purpose of the present disclosure, "at least one of X, Y, and Z" and "at least one selected from a group consisting of X, Y, and Z" may be interpreted as only X, only Y, only Z, or any combination of two or more of X, Y, and Z such as XYZ, XYY, YZ, and ZZ.

As shown in the present disclosure, the term "and/or" includes any and all combinations of one or more of the related items listed.

It should understood that although terms "first", "second", etc. may be used to describe various elements, the elements should not be limited by the terms. The terms are used to distinguish one element from another one element. For example, a first element may be referred to as a second element, and similarly, a second element may be referred to as a first element.

For the purpose of description, spatially relative terms such as "below", "under", "underneath", "down", "above", "up", "on", "higher", "side" (for example, in "sidewall") and the like may be used in the present disclosure to describe relationship between one element and another (or some other) elements as shown in the drawings. In addition to orientations depicted in the drawings, the spatially relative terms are also intended to contain different orientations of an apparatus in use, operation, and/or manufacture. For example, if the apparatus in the drawings is turned over, elements described as "below" or "under" other elements or features will then be oriented "above" or "on" the other elements or features. Therefore, the exemplary term "below" may contain two orientations of above and below. In addition, the apparatus may be otherwise positioned (for example, rotated by 90 degrees or in other orientations), so that the spatially relative terms in the present disclosure are explained accordingly.

The terms used in the present disclosure is for purpose of describing specific embodiments and are not intended to be limiting. As used herein, unless otherwise clearly indicated, a singular form "a", "an" and "the" is also intended to include a plural form. Moreover, when the term "include" is used in this specification, the term indicates a presence of stated features, wholes, steps, operations, elements, components, and/or groups thereof, but does not exclude a presence or addition of one or more other features, other wholes, other steps, other operations, other elements, other components and/or groups thereof. It is also noted that, as used in the present disclosure, the terms "substantially", "about" and other similar terms are used as approximate terms rather than degree terms. Thus, the terms "substantially", "about" and other similar terms are used to describe an inherent deviation of a measured value, a calculated value and/or a provided value that those of ordinary skill in the art would recognize.

Unless otherwise defined, all terms (including technical and scientific terms) used in the present disclosure have the same meanings as commonly understood by those skilled in the art (the present disclosure is a part thereof).

Those skilled in the art should understand that, during an elastic deformation stage of a material, a stress and a strain become proportional (that is, in accordance with Hooke's law), and a proportional coefficient may be called elastic modulus. The "elastic modulus" is a physical quantity that describes elasticity of materials and is a general term. An expression method of the elastic modulus may be "Young's modulus", "bulk modulus" and so on.

"Bending strength" refers to a maximum stress that a material may withstand when the material breaks or reaches a specified bending moment under a bending load, and the stress is a maximum normal stress during bending. The bending strength reflects an ability of a material to resist bending and is used to measure a bending performance of a material.

"Creep" refers to a phenomenon that a strain of a solid material increasing with time going under a condition that the stress is kept constant. The creep is different from a plastic deformation. The plastic deformation usually occurs after a stress exceeds an elastic limit. However, as long as a stress acts for a long time, the creep may also occur even if a stress is smaller than a force applied by an elastic limit.

"Breaking Elongation" refers to a relative elongation of a material at break, that is, a ratio of an elongation of a material at the break to an initial length of the material, which is expressed as a percentage. The breaking elongation is an index that characterizes softness performance and elasticity performance of materials.

"Breaking strength" refers to a ratio of a tensile force of a material at break to a cross-sectional area of the break.

"Light transmittance" or "transmittance" refers to an ability of light to pass through a medium, and is a percentage of a luminous flux that passes through a transparent or semi-transparent body to an incident luminous flux.

"Haze" refers to a percentage of a transmitted light intensity that deviates from an incident light at an angle of more than 2.5° to a total transmitted light intensity. The greater the haze, the lower a gloss and a transparency of the film, especially an image quality.

"100K R3 dynamic bending" means 100,000 times of dynamic bending tests with a bending radius of 3 mm. In this field, the dynamic bending tests may be used to test a dynamic bending performance.

Hereinafter, the exemplary embodiments of the present disclosure will be described with reference to the drawings.

Figure 2:
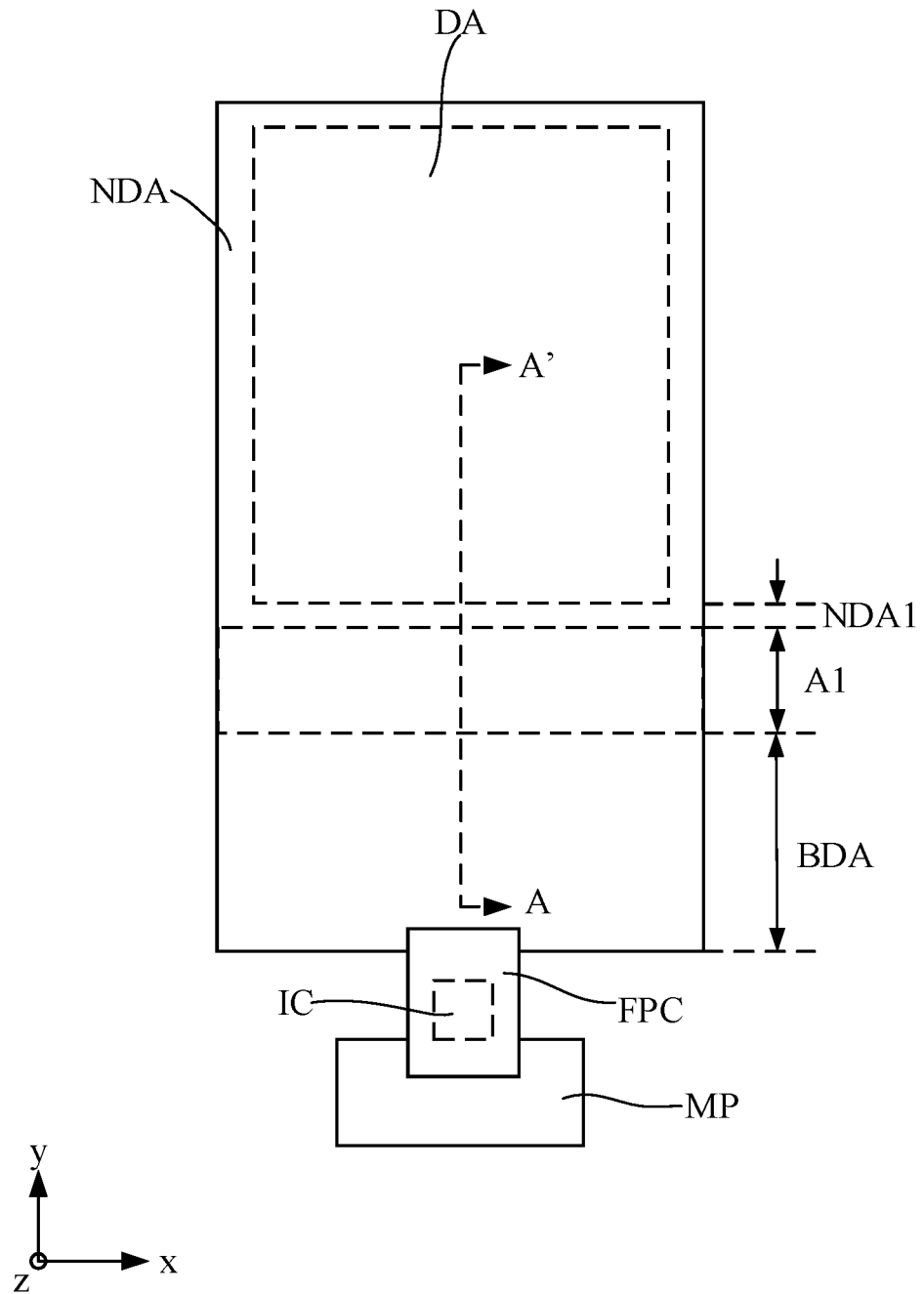
FIG. 2 is a plan view of a display device according to some exemplary embodiments of the present disclosure.
Figure 3:
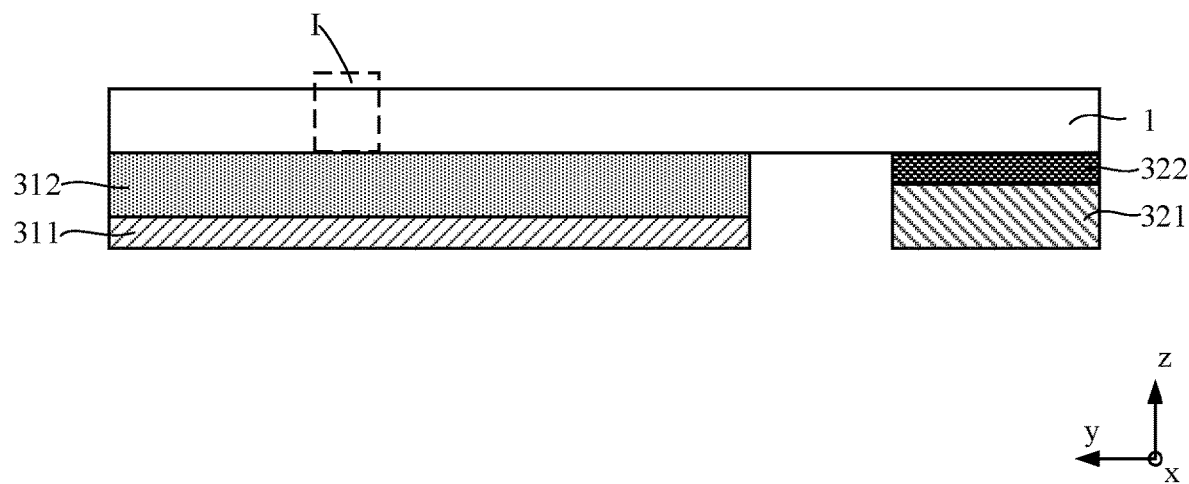
FIG. 3 is a cross-sectional view of the display device taken along line AA' in FIG. 2 according to some exemplary embodiments of the present disclosure.
Figure 4:
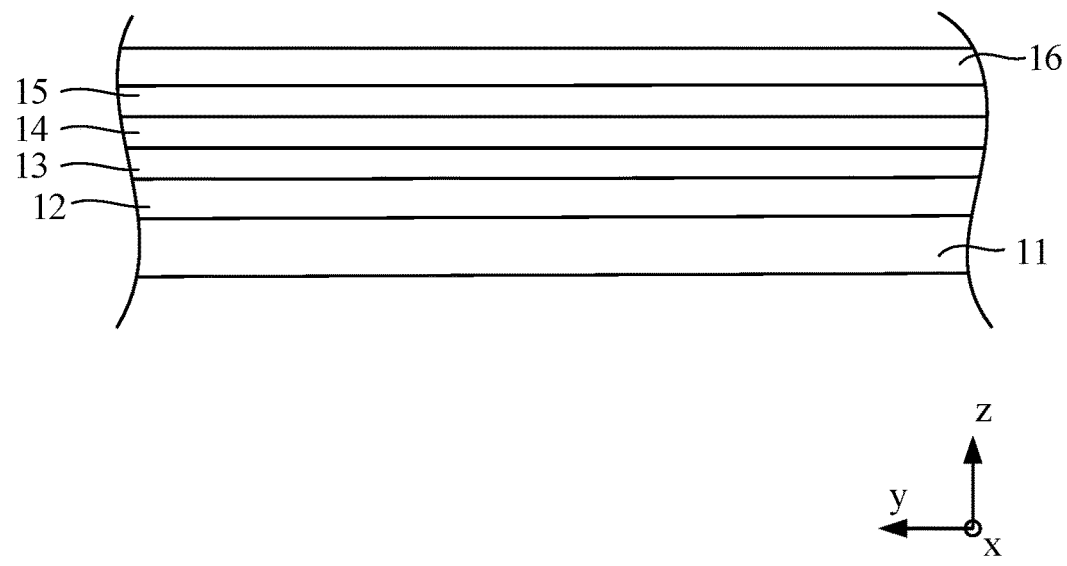
FIG. 4 is an enlarged view of part I in FIG. 3 of the display device according to some exemplary embodiments of the present disclosure.

FIG. 1 is a perspective view of a display device according to some exemplary embodiments of the present disclosure. FIG. 2 is a plan view of a display device according to some exemplary embodiments of the present disclosure. FIG. 3 is a cross-sectional view of the display device taken along line AA' in FIG. 2 according to some exemplary embodiments of the present disclosure. FIG. 4 is an enlarged view of part I in FIG. 3 of the display device according to some exemplary embodiments of the present disclosure.

Referring to FIGS. 1 and 2, a display device 100 may be applied to a mobile terminal, for example. An example of the mobile terminal includes a tablet personal computer (PC), a smart phone, a personal digital assistant (PDA), a portable multimedia player, a game console, or a watch-type electronic device, and so on. However, the embodiments of the present disclosure are not intended to limit the type of the mobile terminal to which the display device 100 is applicable. In some exemplary embodiments, the display device 100 may be used not only in a large electronic device such as a television (TV) or an external billboard, but also in a medium or small electronic device such as a PC, a notebook computer, a car navigation device, or a camera, etc.

The display device 100 may have a rectangular shape in a plan view. The display device 100 may have two short sides extending in a first direction x and two long sides extending in a second direction y. The two long sides and the two short sides of the display device 100 may intersect to form right angles or arc shapes. The embodiments of the present disclosure are not intended to limit a planar shape of the display device 100. For example, in other embodiments, the display device 100 may have a circular shape, a polygonal shape, or other shapes in the plan view.

The display device 100 may include a display panel 1 and a supporting film 3.

The display panel 1 may have a display area DA that displays information such as images and a non-display area NDA that does not display information such as images. In some exemplary embodiments, the non-display area NDA may be disposed to be adjacent to the display area DA, for example, surrounding the display area DA.

In some exemplary embodiments, the display panel 1 may be a display panel that includes light emitting elements. For example, the display panel 1 may include an organic light emitting diode (OLED), a quantum dot light emitting diode (QLED), and/or an inorganic material-based micro-LED. For ease of description, it is assumed that the display panel 1 includes an OLED, and the elements of the display panel 1 will be described in more detail below.

Referring to FIGS. 1 to 4, the display panel 1 of the display device 100 may include elements such as a base substrate 11, a driving layer 12, an organic light emitting element layer 13, an encapsulation layer 14, a polarizer 15, a cover plate 16, etc. It should be understood that the display panel 1 may also include other film layers or elements, which are not described exhaustively in the embodiments of the present disclosure.

Unless otherwise specified, terms "upper", "top", "top surface" and "upward" as used herein refer to a display side of the display panel 1, that is, one side of the display panel 1 in z-axis direction. And terms "lower", "bottom", "bottom surface", "back" and "downward" as used herein refer to an opposite side of the display panel 1 with respect to the display side, that is, one side of the display panel 1 in an direction opposite to the z-axis direction.

The base substrate 11 provides a bottom surface of the display panel 1. The base substrate 11 may be a flexible substrate, and may include a plastic material with relatively excellent heat resistance and durability, such as polyvinyl ether phthalate, polyethylene naphtha late (PEN), polycarbonate (PC), polyarylate, polyetherimide, polyether sulfone (PES) or polyimide (PI). For ease of description, it is assumed that the base substrate 11 includes PI.

The display panel 1 may include a bonding area BDA, for example, a plurality of electrical connection portions (for example, PAD) may be provided in the bonding area BDA to electrically connect a signal line of the display panel 1 to a driving circuit. In some exemplary embodiments, the bonding area BDA is located in the non-display area NDA. As shown in FIG. 1, the bonding area BDA is located on a side of the non-display area NDA away from the display area DA in a direction y.

In some exemplary embodiments, a driver integrated chip (or circuit) IC may be installed on a flexible PCB (i.e, FPC shown in FIG. 1). The driver integrated chip IC provides driving signals to the display panel 1. In some exemplary embodiments, the driver integrated chip IC may include at least one of a data driver that applies data signals to a data line, a gate driver that applies gate signals to a gate line and a signal controller that controls operations of the data driver and the gate driver. In some exemplary embodiments, the driver integrated chip IC may be installed on the flexible PCB in a chip-on-film (COF) manner. In some exemplary embodiments, the driver integrated chip IC may be installed in the non-display area NDA of the display panel 1.

For example, a main PCB (MP shown in FIG. 1) may be electrically connected to the display panel 1 via the FPC. The main PCB may transmit signals to the driver integrated chip IC or receive signals from the driver integrated chip IC. The main PCB may provide image data, control signals, and power supply voltage to the display panel 1 or the FPC. The main PCB may include active elements and passive elements.

The display panel 1 may also include a folding area A1. In a plan view, the folding area A1 may extend through the non-display area NDA along the first direction x. In some exemplary embodiments, the folding area A1 may be disposed in a part of the non-display area NDA adjacent to the display area DA, such as in a part adjacent to the display area DA in the second direction y. That is, the folding area A1 may be located in the non-display area NDA, for example, between the display area DA and the bonding area BDA.

The folding area A1 may be a part of the non-display area NDA, and the folding area A1 may be spaced apart from the display area DA. Referring to FIG. 2, a part of the non-display area NDA disposed under the display area DA may include a first non-display area NDA1 and the bonding area BDA. The first non-display area NDA1 is adjacent to the display area DA, and the bonding area BDA is farther from the display area DA than the first non-display area NDA1. The folding area A1 may be located between the first non-display area NDA1 and the bonding area BDA. The display panel 1 may be bent or folded along a bending axis BX1 located in the folding area A1, the bending axis BX1 extends in the folding area A1 along the first direction x. With the folding area A1, the bonding area BDA of the display panel 1 may be bent or folded to a back surface of the display panel. Therefore, when the display device 100 is viewed from above, the non-display area NDA may be reduced, and a bezel width of the display device 100 may also be reduced.

It should be noted that in the present disclosure, unless otherwise specified, "bending axis" refers to an imaginary line, rather than a physical axis or physical structure. Generally, a component with a bending axis may be bent or folded around the bending axis.

In the embodiments of the present disclosure, the display panel 1 is a flexible display panel. That is, in addition to the part in the folding area A1 that may be bent or folded, at least a part of the display panel 1 located in the display area DA is flexible, that is, the part of the display panel 1 located in the display area DA may be bent or folded, thereby realizing a flexible display device. For ease of description, an area of the display panel 1 excluding the bonding area BDA and the folding area A1 is referred to as a bendable area A2. The bendable area A2 includes at least the display area DA. The folding area A1 is located between the bendable area A2 and the bonding area BDA in the direction y.

Referring to FIG. 1, the supporting film 3 may be disposed under the display panel 1. In some exemplary embodiments, the supporting film 3 may be adhered to the bottom surface of the display panel 1. The supporting film 3 may support the flexible display panel 1 and may protect the bottom surface of the display panel 1.

Figure 9:
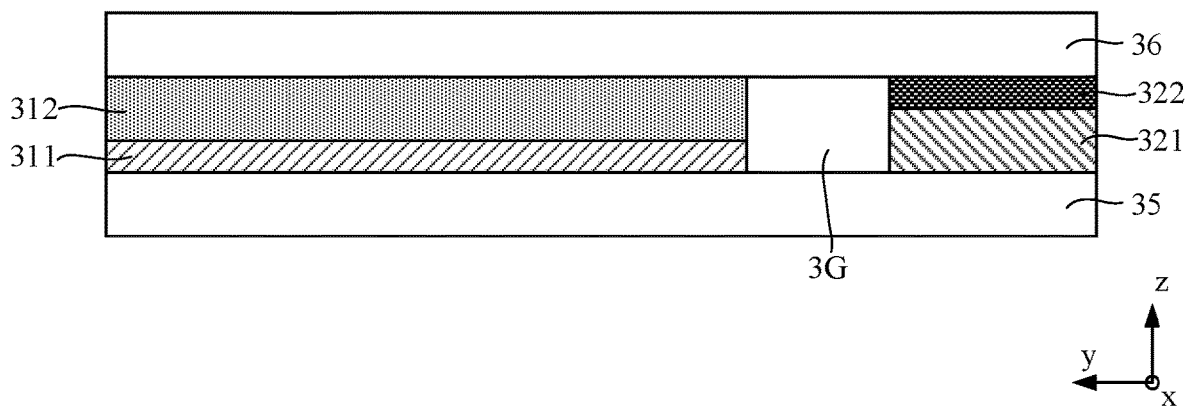
FIG. 9 is a cross-sectional view of a supporting film according to some exemplary embodiments of the present disclosure.

FIG. 9 is a cross-sectional view of a supporting film according to some exemplary embodiments of the present disclosure. With reference to FIGS. 1 to 3 and FIG. 9 in combination, a groove 3G may be defined in the supporting film 3. The groove 3G may be formed to overlap with the folding area A1 of a display panel 1 and may extend along the first direction x. Since the groove 3G is defined in the supporting film 3 to overlap with the folding area A1, the display panel 1 may be bent or folded in the folding area A1.

The supporting film 3 may include a first film portion 31 and a second film portion 32, and the first film portion 31 and the second film portion 32 are separated by the groove 3G. In other words, the supporting film 3 includes the first film portion 31, the groove 3G and the second film portion 32 that are sequentially arranged in the second direction y.

The first film portion 31 may overlap with (for example, coincide) the bendable area A2 of the display panel 1, that is, an orthographic projection of at least the display area DA of the display panel 1 on the supporting film 3 falls within the first film portion 31.

The second film portion 32 may overlap with (for example, coincide) the bonding area BDA of the display panel 1, that is, an orthographic projection of the bonding area BDA of the display panel 1 on the supporting film 3 falls within the second film portion 32.

In the embodiments of the present disclosure, the supporting film 3 adopts a zone-design, that is, the first film portion 31 and the second film portion 32 include different materials or structures. Through such the zone-design, following effects may be achieved: improving a bending performance of the supporting film in the bendable area, such as improving bendability and bending recovery performance, reducing or avoiding creases, etc.; and improving optical performance of the supporting film in the bonding area, for example, increasing a light transmittance.

In the exemplary embodiments of the present disclosure, the first film portion 31 and the second film portion 32 include different materials.

The first film portion 31 includes a first supporting portion 311, and the first supporting portion 311 is made of a material with high elastic modulus. The second film portion 32 includes a second supporting portion 321, and the second supporting portion 321 is made of a material with low elastic modulus. It should be noted that the "high elastic modulus" and the "low elastic modulus" here are relative concepts, which means that the elastic modulus of the material of the first supporting portion 311 is higher than the elastic modulus of the material of the second supporting portion 321. For example, the elastic modulus of the material of the first supporting portion 311 may be 20 to 200 times the elastic modulus of the material of the second supporting portion 321. In this way, the bending performance of the supporting film in the bendable area may be improved, for example, the bending performance and the bending recovery performance may be improved, and the creases may be reduced or avoided.

Optionally, a light transmittance of the second supporting portion 321 may be greater than a light transmittance of the first supporting portion 311. In this way, the optical performance of the supporting film in the bonding area may be improved, for example, the light transmittance may be improved. Therefore, the bonding area may be clearly observed, which is beneficial to grab a bonding mark and observe a crease.

In addition, in conjunction with Table 1 below, in the embodiments of the present disclosure, in addition to considering the elastic modulus and the light transmittance, indicators such as haze, breaking elongation, breaking strength, performance under "100K R3 dynamic bending" test and so on are further considered to be used as a basis for selecting the material of the first supporting portion 311 and the second supporting portion 321.

In some exemplary embodiments, the material of the first supporting portion 311 may include a material with high elastic modulus and low creeping, including but not limited to polyimide (PI) and metal materials such as nickel-iron alloys, copper-zinc alloys, and nickel-titanium alloys, etc.

In some exemplary embodiments, the material of the second supporting portion 321 may include a material with a relatively low elastic modulus and a relatively high light transmittance, including but not limited to, polyethylene terephthalate (PET).

In some exemplary embodiments, a thickness of the first supporting portion 311 may be less than a thickness of the second supporting portion 321. For example, the thickness of the second supporting portion 321 may be 1.3 to 10 times the thickness of the first supporting portion 311. In the embodiments of the present disclosure, since the first supporting portion is made of a material with high elastic modulus and low deformation, a thin first supporting portion may be implemented. Further, the thin first supporting portion may improve the bending performance of the supporting film in the bendable area.

It should be noted that in the present disclosure, the term "thickness" refers to a size of an element, a component or a film layer in a light emitting direction (the third direction z in the drawings).

The first film portion 31 further includes a first adhesive portion 312, and the first adhesive portion 312 includes an adhesive glue such as acrylic glue, which is used to attach the first film portion 31 to the back surface of the flexible display panel 1 to support the display panel 1.

The second film portion 32 further includes a second adhesive portion 322, and the second adhesive portion 322 includes an adhesive glue such as acrylic glue. A material of the first adhesive portion 312 and a material of the second adhesive portion 322 may be the same.

A thickness of the first adhesive portion 312 is greater than a thickness of the second adhesive portion 322. For example, the thickness of the first adhesive portion 312 may be 1.3-10 times the thickness of the second adhesive portion 322. That is, in the above-mentioned bendable area, a thicker adhesive layer may be used to increase a buffer effect of the supporting film in the bendable area, thereby further improving the bending performance of the supporting film in the bendable area.

In the exemplary embodiment of the present disclosure, a sum of the thickness of the first supporting portion 311 and the thickness of the first adhesive portion 312 is equal to a sum of the thickness of the second supporting portion 312 and the thickness of the second adhesive portion 322. In this way, it is beneficial to attach the supporting film to the display panel, thereby meeting attaching requirements.

With reference to Table 2, in the exemplary embodiments of the present disclosure, the thickness of the first supporting portion 311 may be less than the thickness of the first adhesive portion 312, that is, in the bendable area, the supporting film has a structure of a small thickness supporting portion and a large thickness adhesive portion; the thickness of the second supporting portion 321 may be greater than the thickness of the second adhesive portion 322, that is, in the bonding area, the supporting film has a structure of a large thickness supporting portion and a small thickness adhesive portion.

Optionally, in the exemplary embodiments of the present disclosure, the thickness of the first supporting portion 311 may be equal to the thickness of the second adhesive portion 321, and the thickness of the second supporting portion 321 may be equal to the thickness of the first adhesive portion 312.

Referring to FIG. 9, the supporting film 3 may further include a protective film 35 and a release film 36. For example, the protective film 35 is disposed on a side of the first supporting portion 311 away from the first adhesive portion 312, and the protective film 35 is attached to the first supporting portion 311 and the second supporting portion 321. In addition, the protective film 35 covers the first supporting portion 311, the groove 3G and the second supporting film 321 to protect the first supporting portion 311 and the second supporting film 321. The release film 36 is disposed on a side of the first adhesive portion 312 away from the first supporting portion 311, and the release film 36 is attached to the first adhesive portion 312 and the second adhesive portion 322. In addition, the release film 36 covers the first adhesive portion 312, the groove 3G and the second adhesive portion 322 to protect the first adhesive portion 312 and the second adhesive portion 322.

It should be noted that when attaching the supporting film 3 to the display panel 1, the protective film 35 and the release film 36 need to be torn off.

insulate the active layer 121 and the gate electrode 123 from each other. The driving layer 12 may further include a gate insulating layer 124 and a second insulating layer 126. The gate insulating layer 124 is disposed between the gate electrode 123 and the source electrode 125 and between the gate electrode 123 and the drain electrode 127. The second insulating layer 126 is disposed on a side of the gate insulating layer 124 away from the base substrate 11. The source electrode 125 and the drain electrode 127 may be

TABLE 1

Examples of material properties of various parts of the supporting film

|  | First supporting portion | First adhesive portion | Second supporting portion | Second adhesive portion |
|---|---|---|---|---|
| Elastic Modulus | 100~400 Gpa | 1~150 Kpa | 2~5 Gpa | 150~300 Kpa |
| Light transmittance (for example, for light with a wavelength of about 550 nm) | Regardless | — | above 85% | — |
| Haze | Regardless | — | below 15% | — |
| Breaking elongation | below 5% |  | above 40% |  |
| Breaking strength | 1400 Mpa and above |  | 100 Mpa-200 Mpa |  |
| 100K R3 dynamic bending | OK |  | OK |  |

TABLE 2

Examples of material properties and thicknesses of various parts of the supporting film

|  | First supporting portion | First adhesive portion | Second supporting portion | Second adhesive portion |
|---|---|---|---|---|
| Elastic Modulus | 100~400 Gpa | 1~150 Kpa | 2~5 Gpa | 150~300 Kpa |
| thickness | 10~30 μm | 40~100 μm | 40~100 μm | 10-30 μm |
| Example 1 | 15 μm | 40 μm | 40 μm | 15 μm |
| Example 2 | 20 μm | 50 μm | 50 μm | 20 μm |
| Example 3 | 25 μm | 60 μm | 70 μm | 15 μm |

Referring to FIGS. 3 and 4 in combination, the display panel 1 may include the base substrate 11, the driving layer 12, the organic light emitting element layer 13, the encapsulation layer 14, the polarizer 15 and the cover plate 16.

The driving layer 12 may include elements for providing signals to the organic light emitting element layer 13. The driving layer 12 may include various signal lines, for example, a scan line, a data line, a power line, and an emission line. The driving layer 12 may include a plurality of transistors and a plurality of capacitors. A transistor may include a switching transistor and a driving transistor Qd (referring to FIG. 5). Each pixel of the display panel 1 may include a corresponding switching transistor and a corresponding driving transistor Qd.

Figure 5:
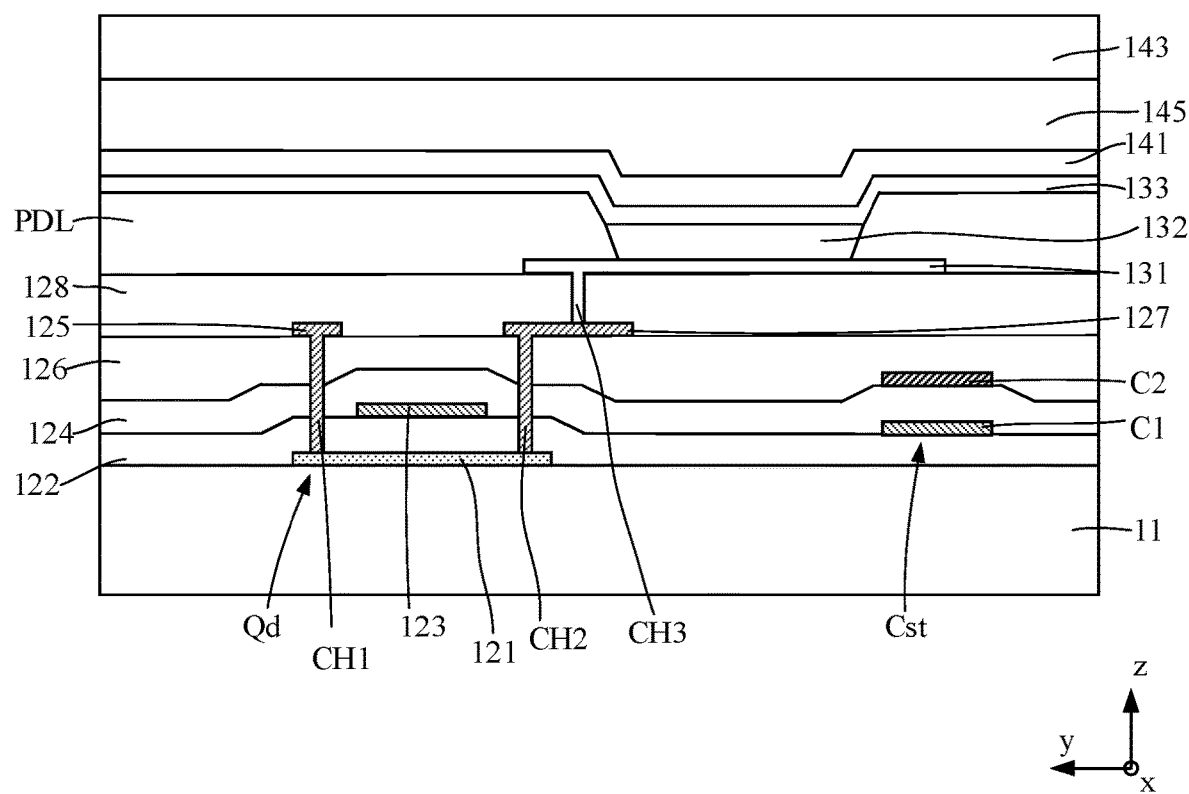
FIG. 5 is a cross-sectional view of a pixel structure of a display panel of a display device according to some exemplary embodiments of the present disclosure.

FIG. 5 is a cross-sectional view of a pixel structure of a display panel of a display device according to some exemplary embodiments of the present disclosure.

Exemplarily, FIG. 5 illustrates the driving transistor Qd of the driving layer 12. The driving transistor Qd includes an active layer 121, a gate electrode 123, a source electrode 125 and a drain electrode 127.

The active layer 121 may be disposed on the base substrate 11. The driving layer 12 may further include a first insulating layer 122 between the active layer 121 and the gate electrode 123. The first insulating layer 122 may electrically connected to the active layer 121 via contact holes CH1 and CH2 formed in the first insulating layer 122, the gate insulating layer 124 and the second insulating layer 126, respectively.

The driving layer 12 may further include a passivation film 128 that is disposed on the source electrode 125 and the drain electrode 127.

Although not specifically shown in FIG. 5, the switching transistor may have substantially the same or the like structure as the driving transistor Qd, but the exemplary embodiments are not limited thereto. That is, alternatively, the switching transistor and the driving transistor Qd may have different structures. For example, an active layer of the switching transistor and the active layer 121 of the driving transistor Qd may be located in different layers.

In some exemplary embodiments, the driving layer 12 may be disposed not only in the display area DA, but also in the non-display area NDA. For example, the driving layer 12 may further include a plurality of wirings electrically connected to the driving integrated circuit (IC), and the plurality of wirings may be located in the non-display area NDA.

It should be understood that the driving layer 12 may further include a capacitor Cst. Referring to FIG. 5, the capacitor Cst includes a first electrode plate C1 and a second electrode plate C2 that are disposed oppositely and at intervals. For example, the first electrode plate C1 and the gate electrode 123 may be located on the same layer, and the second electrode plate C2 may be located on a side of the gate insulating layer 124 away from the base substrate 11. For example, both the first electrode plate C1 and the second electrode plate C2 may be made of the same material as the gate electrode 123.

The organic light emitting element layer 13 may include an organic light emitting element as an emission element. The organic light emitting element may be a top emission-type, and the organic light emitting element may emit light in an upward direction, that is, in the z-axis direction.

Referring to FIG. 5, the organic light emitting element may include a first electrode 131, an organic layer 132 and a second electrode 133.

The first electrode 131 is disposed on the passivation film 128. The first electrode 131 is electrically connected to the drain electrode 127 via a contact hole CH3 formed in the passivation film 128. The first electrode 131 may be a pixel electrode or an anode.

The organic layer 132 may include an organic emission layer formed of a low-molecular organic material or a polymer organic material. The organic emission layer may emit light based on a voltage difference between the first electrode 131 and the second electrode 133. Although not shown, the organic layer 132 may further include at least one of a hole transportation layer (HTL), a hole injection layer (HIL), an electron transportation layer (ETL) and an electron injection layer (EIL). Therefore, holes from the first electrode 131 and n electrons from the second electrode 133 may be injected into the organic layer 132. In the organic emission layer, the holes and the electrons may be combined to generate an exciton, and as the exciton transits from an excited state to a ground state, light may be emitted.

The second electrode 133 may be disposed on the organic layer 132. The second electrode 133 may be a common electrode or a cathode.

The organic light emitting element layer 13 may further include a pixel defining layer PDL disposed on the passivation film 128.

In the exemplary embodiments of the present disclosure, the organic light emitting element layer 13 may be disposed only in the display area DA of the display panel 1 and not in the non-display area NDA.

The encapsulation layer 14 may be disposed on the organic light emitting element layer 13. The encapsulation layer 14 may protect the organic light emitting element layer 13 from external moisture and air.

In some exemplary embodiments, the encapsulation layer 14 may be formed as a thin film encapsulation layer, and the encapsulation layer 14 may include at least one organic film and at least one inorganic film. For example, the encapsulation layer 14 may include a first inorganic film 141 on the second electrode 133, an organic film 145 on the first inorganic film 141 and a second inorganic film 143 on the organic film 145. In this case, the encapsulation layer may effectively prevent moisture and air from permeating into an inside of the display panel 1 from an outside of the display panel 1.

As an example, the encapsulation layer 14 may not completely cover the non-display area NDA of the display panel 1. For example, the encapsulation layer 14 may be disposed in the bendable area A2, but not in the folding area A1 and the bonding area BDA.

Referring to FIGS. 3 to 5, the polarizer 15 is disposed on a side of the encapsulation layer 14 away from the base substrate 11 to polarize light emitted by the organic light emitting element. It should be understood that the display panel according to the embodiments of the present disclosure may further include other types of optical film layers and is not limited to the polarizer.

As an example, the polarizer 15 may be disposed only in the display area DA of the display panel 1 and not in the non-display area NDA.

The cover plate 16 is attached to the polarizer 15 via an optical adhesive layer. For example, the cover plate 16 may cover an entire upper surface of the display panel 1, that is, the cover plate 16 covers the display area DA and the non-display area NDA of the display panel 1.

Figure 6:
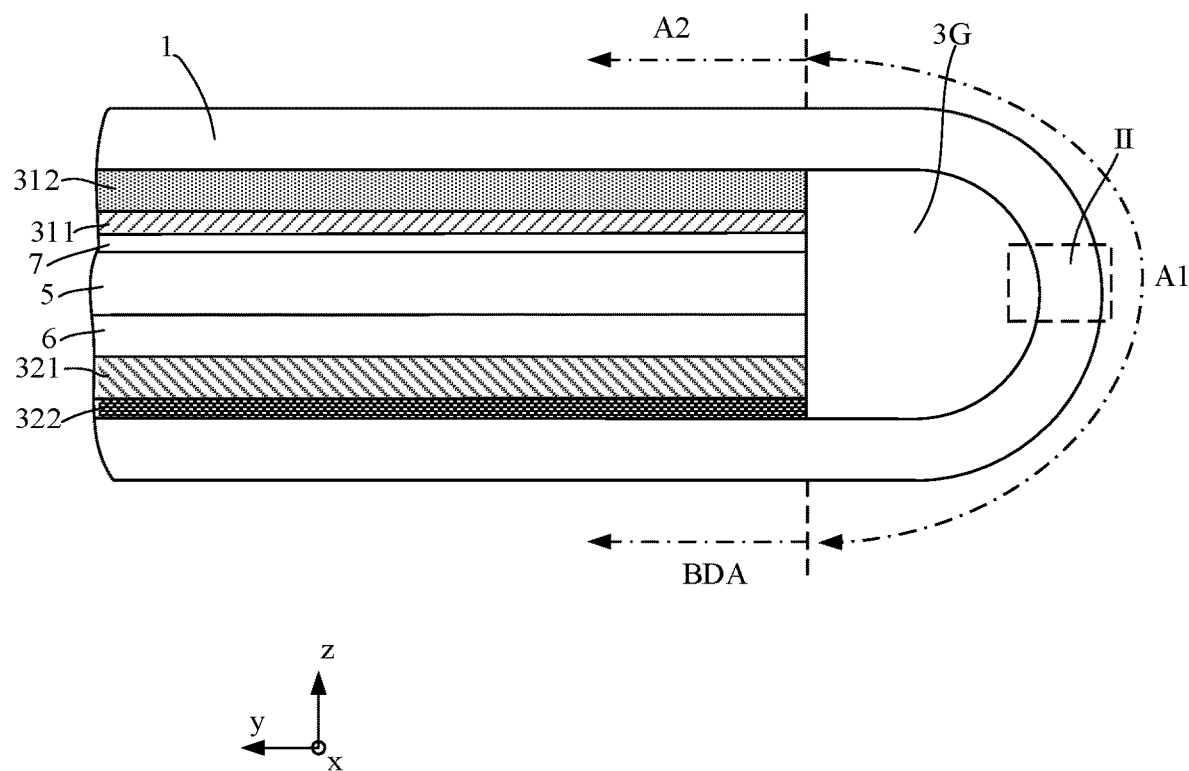
FIG. 6 is a cross-sectional view of a display device in a state where a non-display area is folded around an axis in a folding area according to some exemplary embodiments of the present disclosure.

FIG. 6 is a cross-sectional view of a display device in a state where a non-display area is folded around an axis in a folding area according to some exemplary embodiments of the present disclosure.

Referring to FIG. 6, the display panel 1 may be bent or folded in a downward direction along the bending axis BX1 (see FIG. 1) extending in the first direction x in the folding area A1. Since the groove 3G overlapping with the folding area A1 is defined in the supporting film 3, the display panel 1 may be easily bent.

Since a part of the non-display area NDA of the display panel 1 is bent or folded to the back surface of the display panel 1, the non-display area NDA of the display device 100 as viewed from outside may be reduced, so that the bezel width of the display device 100 may be reduced.

Figure 7:
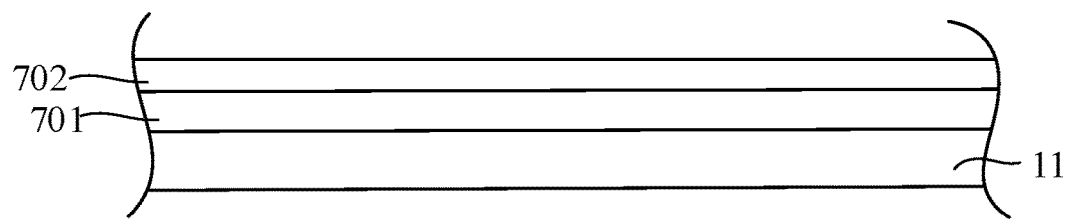
FIG. 7 is a partial enlarged view of the display device at part II of FIG. 6 according to some exemplary embodiments of the present disclosure.

FIG. 7 is a partial enlarged view at part II of FIG. 6 of a display device according to some exemplary embodiments of the present disclosure. Referring to FIGS. 6 and 7 in combination, in the folding area A1, the display device 100 may include a wiring layer 701 and a protective layer 702. A wiring in the wiring layer 701 may electrically connect a circuit in the display area DA with the driving integrated circuit, and the protective layer 702 may protect the wiring.

Referring back to FIG. 6, the first film portion 31 of the supporting film 3 is disposed under the display panel 1 to support the display panel 1. For example, the first adhesive portion 312 of the first film portion 31 is disposed between the first supporting portion 311 and the display panel 1 to attach the first supporting portion 311 to the display panel 1. The second film portion 32 of the supporting film 3 is folded to the back surface of the display panel 1. In this way, in the folded state of FIG. 6, the second supporting portion 321 is closer to the bendable area A2 of the display panel 1 than the second adhesive portion 322, that is, that is, the second supporting portion 321 is on the second adhesive portion 322.

The display device 100 may include a supporting member 5, for example, the supporting member 5 may be a metal supporting member. The supporting member 5 is sandwiched between the first film portion 31 and the second film portion 32 of the supporting film 3 to support the flexible display panel 1.

Specifically, the display device 100 may further include a third adhesive portion 6, for example, the third adhesive portion 6 may be double-sided tape, foam tape, or the like. The third adhesive portion 6 is disposed between the second supporting portion 321 and the supporting member 5 to attach the supporting member 5 and the second supporting portion 321. An upper surface of the third adhesive portion 6 directly contacts a lower surface of the supporting member 5, and a lower surface of the third adhesive portion 6 directly contacts an upper surface of the second supporting portion 321.

The display device 100 may further include a fourth adhesive portion 7, for example, the fourth adhesive portion 7 may include an optical adhesive. The fourth adhesive portion 7 is disposed between the first supporting portion 311 and the supporting member 5 to attach the supporting member 5 and the first supporting portion 311. An upper surface of the fourth adhesive portion 7 directly contacts a lower surface of the first supporting portion 311, and a lower surface of the fourth adhesive portion 7 directly contacts an upper surface of the supporting member 5.

By providing the supporting member with higher strength and elastic modulus, it may be ensured that the display device has good resilience performance after being bent during use, and creases may be reduced or even avoided.

In the embodiments of the present disclosure, the first supporting portion 311 is made of a material with high elastic modulus such as nickel-iron alloy, copper-zinc alloy, nickel-titanium alloy, that is, the first supporting portion 311 itself has high strength and high elastic modulus. In this way, a thickness of the supporting member 5 may be reduced or, only a single-layer supporting member is needed to achieve purposes of improving resilience performance and reducing creases.

Since the thickness of the supporting member is reduced, a folding radius in the folding area A1 is reduced in the folded state shown in FIG. 6. In this way, the bezel width of the display device 100 may be further reduced.

Figure 8:
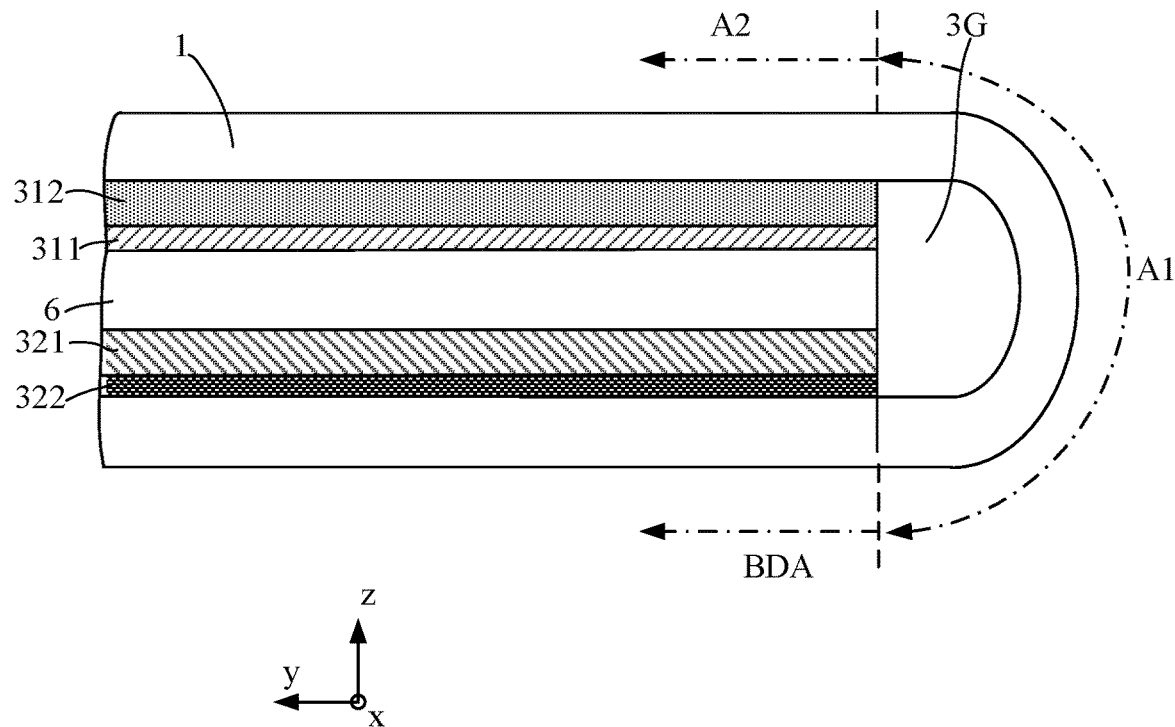
FIG. 8 is a cross-sectional view of a display device in a state where a non-display area is folded around an axis in a folding area according to some other exemplary embodiments of the present disclosure.

FIG. 8 is a cross-sectional view of a display device in a state where a non-display area is folded around an axis in a folding area according to some other exemplary embodiments of the present disclosure. Referring to FIGS. 6 and 8 in combination, in the embodiment of FIG. 8, the supporting member 5 is eliminated, that is, the first supporting portion 311 and the second supporting portion 321 of the supporting film 3 are directly attached to each other.

Specifically, the display device 100 may include a third adhesive portion 6, for example, the third adhesive portion 6 may be double-sided tape, foam tape, or the like. The third adhesive portion 6 is disposed between the second supporting portion 321 and the first supporting portion 311 to attach the second supporting portion 321 and the first supporting portion 311. An upper surface of the third adhesive portion 6 directly contacts a lower surface of the first supporting portion 311, and a lower surface of the third adhesive portion 6 directly contacts an upper surface of the second supporting portion 321, that is, no supporting member is provided between the first supporting portion 311 and the second supporting portion 321.

In the embodiments of the present disclosure, the first supporting portion 311 is made of a material with high elastic modulus such as nickel-iron alloy, copper-zinc alloy, nickel-titanium alloy, that is, the first supporting portion 311 itself has high strength and high elastic modulus. In this way, through the first supporting portion itself, purposes of improving resilience performance and reducing creases may be achieved, so that additional supporting members may be omitted.

Since the supporting member is omitted, in the folded state shown in FIG. 8, the folding radius in the folding area A1 is further reduced, so that the bezel width of the display device 100 may be further reduced.

FIGS. 10A to 10F respectively illustrate cross-sectional views of a supporting film after some steps of a manufacturing method of a supporting film are performed according to some exemplary embodiments of the present disclosure. The manufacturing method of the supporting film according to some exemplary embodiments of the present disclosure may be performed according to following steps.

Figure 10A:
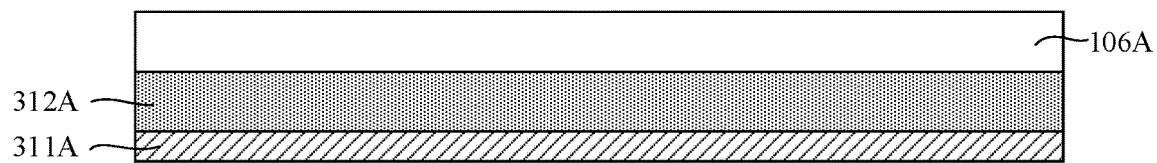
FIGS. 10A to 10F respectively illustrate cross-sectional views of a supporting film after some steps of a manufacturing method of a supporting film are performed according to some exemplary embodiments of the present disclosure.
Figure 10B:
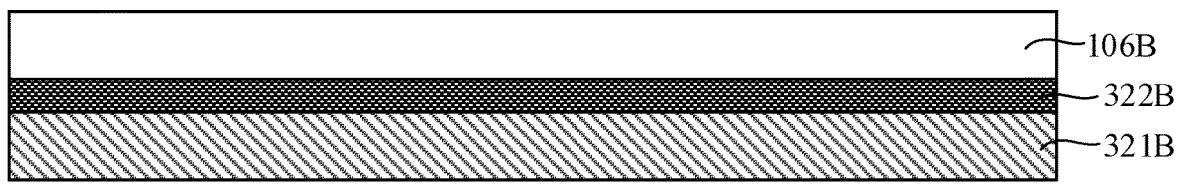

Referring to FIGS. 10A and 10B, a first supporting film master-sheet 3A and a second supporting film master-sheet 3B are respectively formed. For example, the first supporting film master-sheet 3A may include a release film 106A, a first adhesive portion 312A and a first supporting portion 311A that are sequentially stacked. The second supporting film master-sheet 3B may include a release film 106B, a second adhesive portion 322B and a second supporting portion 321B that are sequentially stacked. It should be noted that sizes of the first supporting film master-sheet 3A and the second supporting film master-sheet 3B are relatively large, and they may be made into a plurality of supporting films as shown in FIG. 9.

It should be understood that a material and a thickness of the release film, the supporting portion and the adhesive portion may be referred to the above description, and will not be repeated here.

Figure 10C:
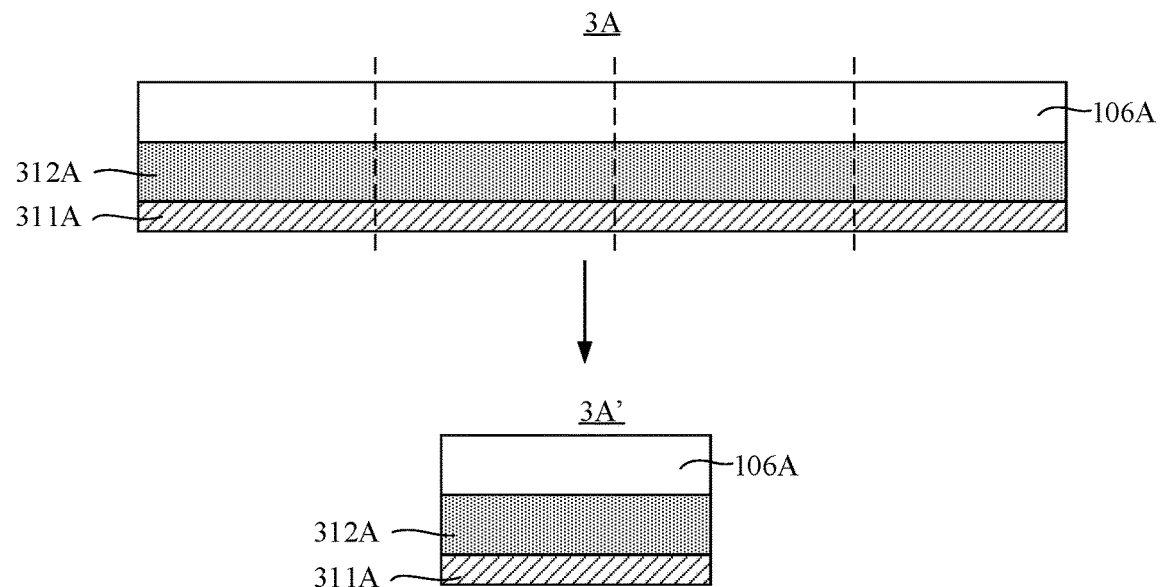
Figure 10D:
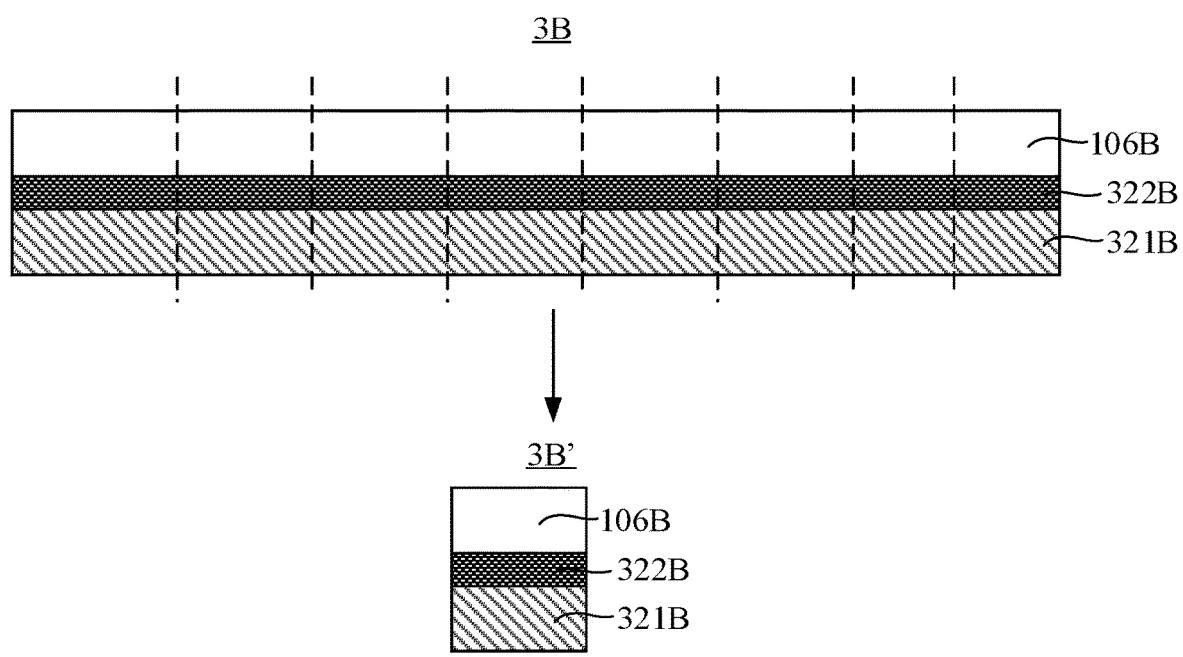

Referring to FIGS. 10C and 10D, the first supporting film master-sheet 3A and the second supporting film master-sheet 3B are cut, respectively. For example, the first supporting film master-sheet 3A and the second supporting film master-sheet 3B are cut along dashed lines in FIG. 10C and FIG. 10D to form a plurality of small-sized first supporting film sub-sheets 3A' and a plurality of small-sized second supporting film sub-sheets 3B'.

Figure 10E:
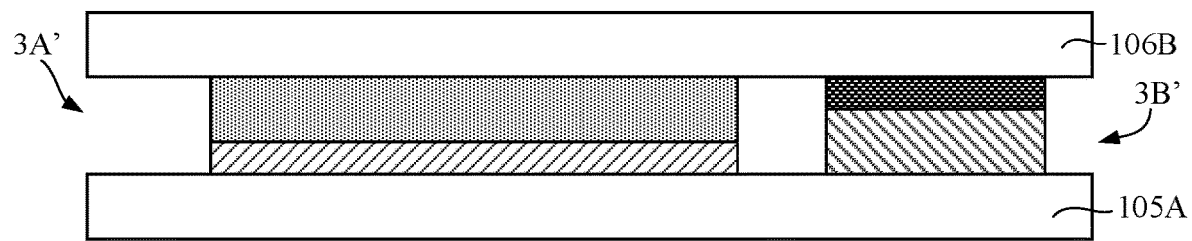

Referring to FIG. 10E, a release film on the first supporting film sub-sheet 3A' and a release film on the second supporting film sub-sheet 3B' are respectively torn off, and the first supporting film sub-sheet 3A' and the second supporting film sub-sheet 3B' without the release films are attached to the same release film 106B and the same protective film 105A at predetermined intervals.

Figure 10F:
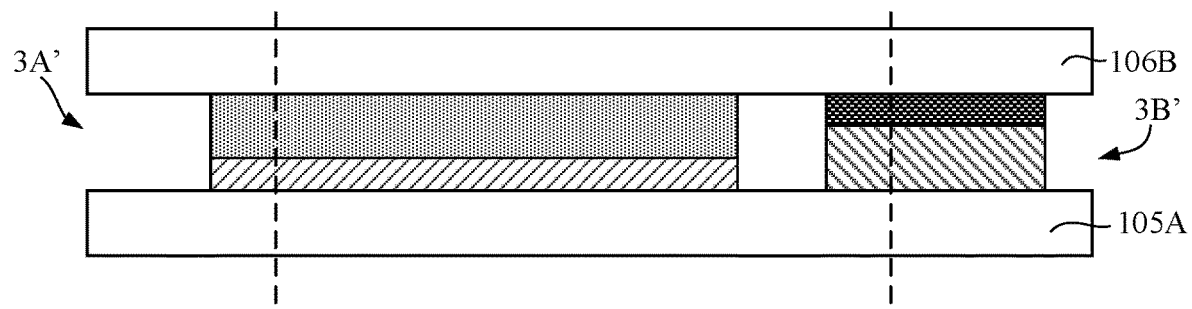

Referring to FIG. 10F, the structure shown in FIG. 10E is cut according to a predetermined size, for example, cut according to dashed lines in FIG. 10F to form the supporting film 3 shown in FIG. 9.

Through such the manufacturing method, a supporting film with zone-design may be formed.

In some other embodiments of the present disclosure, an electronic apparatus is also provided. The electronic apparatus may be a device including a display function, that is, an apparatus including the above-mentioned display device. For example, the electronic apparatus may be a smart phone, a mobile phone, a video phone, an e-book reader, a desktop computer (PC), a laptop PC, a netbook PC, a personal digital assistant (PDA), a portable multimedia player (PMP), a digital audio player, a mobile medical apparatus, a camera, a wearable device (such as head-mounted apparatus, electronic clothing, electronic bracelet, electronic necklace, electronic accessory, electronic tattoo, or smart watch), etc.

The electronic apparatus according to the embodiments of the present disclosure may be a smart home appliance including a display function. For example, the smart home appliance may be a TV, a digital video disk (DVD) player, a stereo, a refrigerator, an air conditioner, a vacuum cleaner, an oven, a microwave oven, a washing machine, a dryer, an air purifier, a set-top box, a television (TV) box, a game console, an electronic dictionary, an electronic key, a video recorder, an electronic photo frame, etc.

The electronic apparatus according to the embodiments of the present disclosure may be a medical apparatus (for example, a magnetic resonance vascular imaging (MRA) apparatus, a magnetic resonance imaging (MRI) apparatus, a tomography (CT) apparatus, an imaging apparatus, or an ultrasound apparatus), a navigation apparatus, a Global Positioning System (GPS) receiver, an event data recorder (EDR), a flight data recorder (FDR), a car infotainment apparatus, a nautical electronic apparatus (for example, a nautical navigation apparatus, a gyroscope, or a compass), an avionics apparatus, a safety apparatus, an industrial or consumer robot, an automatic teller machine (ATM), a point of sale (POS), etc.

The electronic apparatus according to the embodiments of the present disclosure may be furniture including a display function, a part of a building/structure, an electronic billboard, an electronic signature receiving apparatus, a projector, various measuring apparatuses (for example, a water meter, an electric meter, a gas meter, or an electromagnetic wave measuring equipment) etc. The electronic apparatus according to some embodiments may be any combination of the aforementioned apparatuses. Moreover, the electronic apparatus according to the various embodiments may be a flexible apparatus. In addition, it should be clear to those skilled in the art that electronic apparatus according to the various embodiments of the present disclosure are not limited to above-mentioned apparatuses.

Although some embodiments according to the general inventive concept of the present disclosure have been illustrated and described, those skilled in the art will understand that changes may be made to the embodiments without departing from the principle and spirit of the general inventive concept of the present disclosure, and the scope of the present disclosure is defined by the claims and their equivalents.

What is claimed is:

1. A display device, wherein the display device comprises:
a display panel, the display panel comprises:
a bendable area, the bendable area comprises at least a display area of the display panel;
a bonding area, the bonding area comprises a part of a non-display area of the display panel; and
a folding area, the folding area is located between the bendable area and the bonding area; and
the display device further comprises a supporting film, the supporting film is adhered to a back surface of the display panel, the supporting film comprises a first film portion and a second film portion, an orthographic projection of the first film portion on the display panel falls within the bendable area, and an orthographic projection of the second film portion on the display panel falls within the bonding area,
wherein a material of the first film portion is different from a material of the second film portion,
wherein the first film portion comprises a first supporting portion, the second film portion comprises a second supporting portion, and an elastic modulus of the material of the first supporting portion is greater than an elastic modulus of the material of the second supporting portion,
wherein a thickness of the first supporting portion is smaller than a thickness of the second supporting portion, and
wherein the first film portion further comprises a first adhesive portion, the first supporting portion is adhered to the back surface of the display panel through the first adhesive portion, and an orthographic projection of the first adhesive portion on the display panel falls within an orthographic projection of the first supporting portion on the display panel; and the thickness of the first supporting portion is smaller than a thickness of the first adhesive portion.

2. The display device of claim 1, wherein a light transmittance of the second supporting portion is greater than a light transmittance of the first supporting portion.

3. The display device of claim 1, wherein the second film portion further comprises a second adhesive portion, the second supporting portion is adhered to the display panel through the second adhesive portion, and an orthographic projection of the second adhesive portion on the display panel falls within an orthographic projection of the second supporting portion on the display panel; and
the thickness of the second supporting portion is greater than a thickness of the second adhesive portion.

4. The display device of claim 3, wherein a sum of the thickness of the first supporting portion and the thickness of the first adhesive portion is equal to a sum of the thickness of the second supporting portion and the thickness of the second adhesive portion.

5. The display device of claim 1, wherein the first supporting portion comprises at least one of following materials: polyimide, nickel-iron alloy, copper-zinc alloy or nickel-titanium alloy; and/or,
the second supporting portion comprises polyethylene terephthalate.

6. The display device of claim 1, wherein the elastic modulus of the material of the first supporting portion is 20 to 200 times the elastic modulus of the material of the second supporting portion.

7. The display device of claim 1, wherein the supporting film further comprises a groove, the groove is located between the first film portion and the second film portion to separate the first film portion from the second film portion, and an orthographic projection of the groove on the display panel falls within the folding area.

8. The display device of claim 1, wherein the display device further comprises a third adhesive portion on a side of the first film portion away from the display panel, and the third adhesive portion is located between the first film portion and the second film portion when the non-display area is folded around an axis in the folding area.

9. The display device of claim 8, wherein a surface of the third adhesive portion close to the first film portion directly contacts the first supporting portion, and a surface of the third adhesive portion close to the second film portion directly contacts the second supporting portion.

10. The display device of claim 8, wherein the display device further comprises a supporting member between the first film portion and the third adhesive portion.

11. The display device of claim 10, wherein the display device further comprises a fourth adhesive portion between the first film portion and the supporting member;
a surface of the third adhesive portion close to the supporting member directly contacts the supporting member, and a surface of the third adhesive portion close to the second film portion directly contacts the second supporting portion;
a surface of the fourth adhesive portion close to the supporting member directly contacts the supporting member, and a surface of the fourth adhesive portion close to the first film portion directly contacts the first supporting portion.

12. An electronic apparatus, wherein the electronic apparatus comprises the display device of claim 1.

13. The display device of claim 3, wherein the supporting film further comprises a groove, the groove is located between the first film portion and the second film portion to separate the first film portion from the second film portion, and an orthographic projection of the groove on the display panel falls within the folding area.

\* \* \* \* \*